May 21, 1968     T. G. ALTENEDER, JR     3,383,771
CALIBRATION MEANS FOR A MEASURING RULE
Filed April 5, 1967
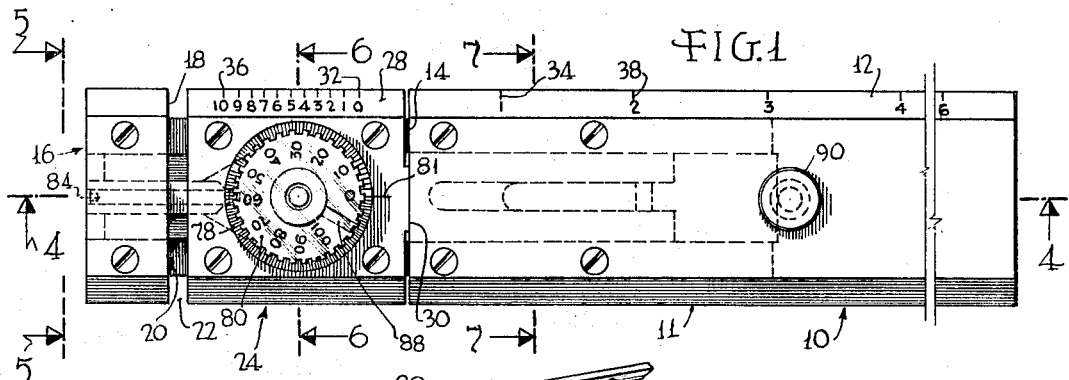
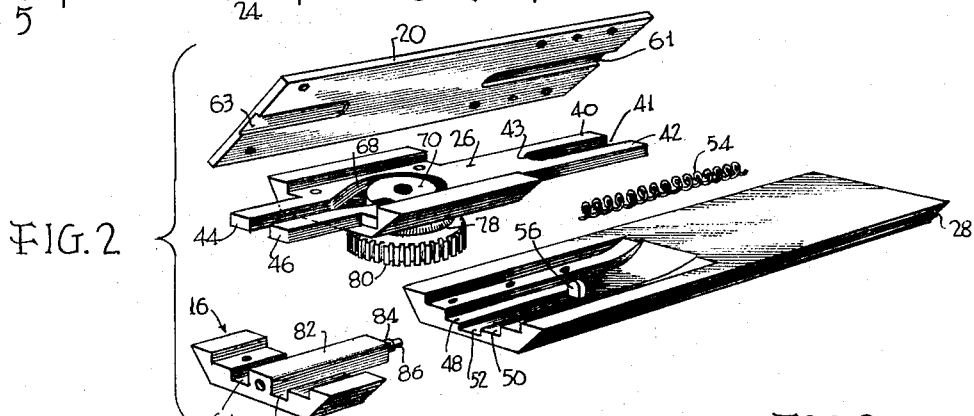
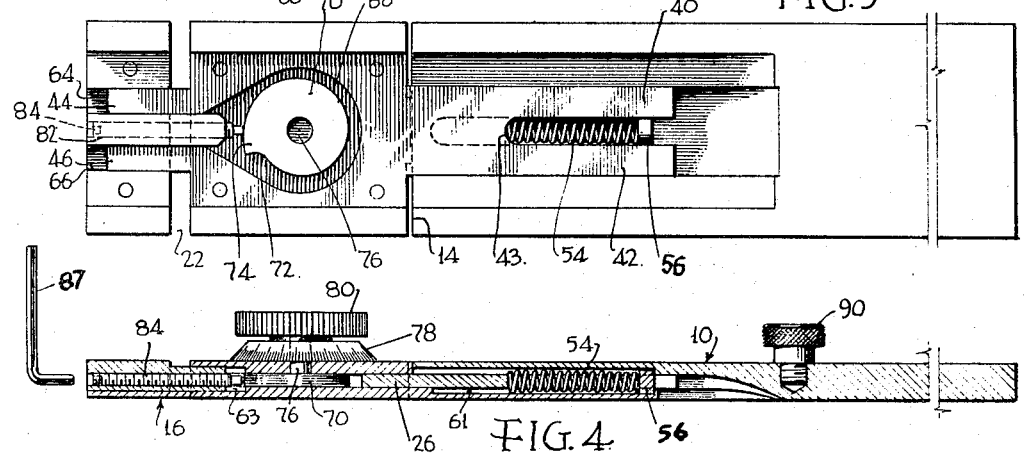
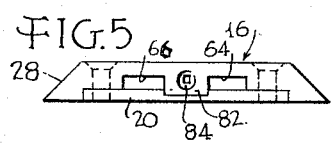
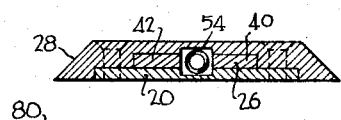
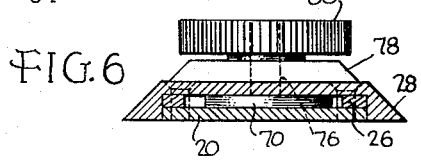
INVENTOR.
Theodore G. Alteneder, Jr.
BY Edward M. Farrell
ATTORNEY 3,383,771
CALIBRATION MEANS FOR A
MEASURING RULE
Theodore G. Alteneder, Jr., Hatboro, Pa., assignor to Theodore Alteneder and Sons, a corporation of Pennsylvania
Filed Apr. 5, 1967, Ser. No. 628,594
3 Claims. (Cl. 33—107)

ABSTRACT OF THE DISCLOSURE

A measuring rule includes a movable member adapted to be moved from a zero reference point in small increments away from a main fixed rule having graduations thereon. Means are provided to adjust the position of the movable member to compensate for slight deviations from the zero reference point which may develop during the use of the rule.

---

This invention constitutes modification of a rule of the type illustrated in a patent to E. A. Ermold, 2,554,099, which is assigned to the same assignee as the subject application.

In measuring rules of the type described in the aforementioned patent, precision measurements are possible in the order of one one-thousandth of an inch. This was made possible by providing a main fixed portion of a rule graduated in suitable lengths such as twelve, eighteen or more inches. A movable element having one-tenth inch spaced graduations thereon is disposed in longitudinal alignment with the main fixed portion of the rule. The one-tenth inch graduations on the movable element make it possible to take measurements within one tenth of an inch directly from the rule without manipulating the rule. A graduated dial included on the movable element includes one hundred graduations. Movement of the dial from a fixed zero reference point causes the movable member to move away from the fixed portion of the rule with the total movement being limited to one tenth of an inch for slightly less than one complete revolution of the dial. Thus by moving the dal in small increments, measurements within one one-thousandth of an inch are possible, since each graduation of the dial represents one one-hundredth of one tenth of an inch.

A problem encountered in the prior art with the types of rule described is that after the rule has been in use for some time, the zero reference point tends to change, i.e., a zero reading on the dial does not represent zero. Thus readings from the rule will tend to be off unless the zero calibration error is taken into account. In many cases, the reason for the zero calibration deviations is because of the slight wearing of some of the parts or some slight looseness developing within the parts resulting from extensive use.

In a rule such as described in the aforementioned patent, a cam element having a constant rise from a low point to a high point is mounted for rotation upon a shaft. The cam engages a roller or other element and is held in contact therewith by means of a compression spring which continuously engage the cam against the roller. A graduated dial is connected to move the cam in small increments. The cam is fixedly connected to the movable portion of the rule thereby causing it to move away from the main portion of the rule in accoradnce with the position of the cam.

In the type of rule described, if either the cam or the roller is not maintained at precisely the same positions, the original calibrations will tend to deviate. Also, the slightest wear of either the cam, roller or the members to which they are connected will tend to cause the calibrations to vary resulting in erroneous measurements. While these wrong measurements may be extremely slight, the precision applications in which such rules are used do not allow for such inaccuracies.

It is an object of this invention to provide an improved measuring rule which may be recalibrated from time to time to correct for inaccuracies caused by deviations of the zero reference points.

It is a further object of this invention to provide an improved measuring rule which may be easily calibrated from time to time by an operator with a minimum amount of manipulation of the rule.

It is still a further object of this invention to provide an improved measuring rule wherein an operator may easily calibrate the rule while the rule is laying flat on a work table with the dial to be calibrated facing him.

It is still a further object of this invention to provide an improved measuring rule wherein adjustments may be first made, with the manual means for moving a calibrated dial then mounted without changing the adjustments previously made.

Other objects and advantages of the present invention will be apparent and suggest themselves to those skilled in the art from a reading of the following specification and claims, in conjunction with the accompanying drawing, in which:

FIGURE 1 is a plan view of a measuring rule illustrating one embodiment of the present invention;

FIGURE 2 is an exploded view showing some of the working parts of the rule of FIGURE 1;

FIGURE 3 is a fragmentary plan view of the rule illustrated in FIGURE 1, with the upper plate thereof removed to illustrate some of the movable working parts of the rule;

FIGURE 4 is a cross sectional view taken along lines 4—4 of FIGURE 1;

FIGURE 5 is an end view taken along lines 5—5 of FIGURE 1;

FIGURE 6 is a cross sectional view taken along lines 6—6 of FIGURE 1, and

FIGURE 7 is a cross sectional view taken along lines 7—7 of FIGURE 1.

Referring to the drawing, a rule 10 comprises a main portion or shell 11 of any desired length with the working face thereof being provided with a sloping edge surface 12 having indicia thereon, which may, for example, represent inches. The outer or left working surface of the rule is interrupted toward one end by the transverse edge 14 normal to the edge of the sloping edge surface 12. An end element 16 includes a parallel spaced transverse edge 18 also normal to the edge of the sloping edge surface 12. The main portion 11 and the end element 16 are maintained in a fixed relationship to each other by a supporting strip 20.

Edges 14 and 18 define a space 22 longitudinal of the rule, in which there is slidably movably mounted a sub unit shell 24 mounted on a plate 26 to be described.

The sub unit shell 24 also has a sloping edge surface 28 aligned with the sloping surface 12 of the fixed main portion 11 of the rule 10.

The sub unit shell 24 comprises a slidable member disposed so that when its lateral edge 30 abuts the first mentioned transverse edge 14, a zero graduation 32, on the edge 28 of the slidable unit 24 is exactly one inch away from the indicia "1" indicated at line 34 in FIGURE 1. Thus when the units of the rule are in inches, it is exactly a full inch between zero line 32 and graduation at the line 34. The remainder of the fixed rule portion, toward the right in FIGURE 1, is similarly serially graduated to a final graduation, with the number of graduations being determined by length of the rule. It will be observed at this point a distance can be measured starting at zero on the slidable sub unit 24 and going to the furthest graduation for the linear dimension measured.

The slidable sub unit 24, adapted to be moved between the main and end portions of the rule, is also marked off from the zero point 32 at one end at the right, to a final point 36 at the left end marked "10." In the embodiment of the invention illustrated one full inch is delineated between the marks 32 and 36. This inch space is graduated into ten equal subdivisions spaced one tenth of an inch apart, as indicated.

The slidable sub unit 24 is arranged to be moved away from the edge 14 and toward the edge 18 by a distance of exactly one-tenth of an inch. At its maximum movement, the zero point 32 will have been moved one-tenth of an inch relative to its starting point, so that when so moved the total distance between the zero point 32 and the graduation at line 34 will be one and one-tenth inches. This maximum movement is unnecessary, however, to effect such an inch and one-tenth measurement, since the slidable sub unit 24 could have been kept stationary in its normal position against edge 14 and the second graduation i.e. the one to the right of the zero mark 32 could have been read directly by an operator. Therefore, with the sub unit 24 movable within the space 22, the scale or rule can read from the "1" graduation at line 34 with measurements from an exact inch, to one inch plus increments of one tenth inch being possible, until two inches are so read. Again, however, this latter reading would be unnecessary as it would be easier to read the two inches directly from the normal zero to the graduation "2" at line 38. It is desirable, however, to add tenth inches to the even number inch readings to secure desired fractional readings. Of course, tenth inches are too coarse for the average use of the rule of the type described and is therefore desirable to be able to effect further and more subdivisions.

The slidable sub unit 24 in the line of the rule is mounted rigidly upon an intermediate guiding and supporting plate 26 and the latter has right and left pairs of tongue elements, with tongue elements 40 and 42 being disposed to the right and tongue elements 44 and 46 being disposed to the left as seen in FIGURE 2. The tongue elements 40, 42, 44, and 46 are disposed to slide under the shell of the main portion 11 and the end element 16. The plate 26 and its associated parts are slidable on plate 20.

The main portion 11 of the rule has forward spaced guide strips 48 and 50, between which the right tongue elements 40 and 42, having a slot therebetween, are slidably guided. The main portion 11 is longitudinally slotted as at slot 52 to receive a compression spring 54 and includes an abutment 56 at the end of the slot 52.

As mentioned the under surface of the shell portion 11 of the rule, upon which all of the previously described fixed calibrations appear, is longitudinally grooved terminating at the abutment 56 to receive one end of the spring 54. The other end of the spring 54 abuts against abutment 43. The spring 54 is therefore compressed between abutments 43 and 56.

The slidable sub unit 24 also carries a second pair of tongue elements 44 and 46 which are slidably guided between spaced guide surfaces 64 and 66 disposed beneath the shell of the end element 16. This arrangement permits the slidable sub unit 24 to be slidably but firmly guided at both side edges thereby maintaining an aligned position relative to the edge 12 of the scale of the rule.

The plate 20 also includes a groove or slot 61 to receive a portion of the spring 54 when the rule is assembled. The plate 20 also includes a second groove 63 to receive an adjustment mechanism as will be described.

The slidable supporting plate or element 26 upon which the sub unit 24 is rigidly mounted is provided with a generally eccentrically or asymmetrically shaped opening 68.

A cam element 70 having a constant rise from a low point 72 to a high point or swell 74 is mounted rigidly upon a shaft 76 journalled in the slidable sub unit 24. The upper free end of the shaft is fixedly engaged by a calibrated dial or disc 78 and a manual control knob 80. The calibrated disc is rigidly mounted on the shaft 76 and contains radial calibrations and is angularly adjustable with the knob 80 and shaft 76 relative to a fixed datum line 81 on the sub unit 24.

The end element 16 includes an element 82 having a threaded opening extending therethrough to receive an adjustment screw 84 having an end bearing element 86. The screw is adapted to be moved in and out of the threaded opening different amounts dependent upon the amount of adjustment required. The end element 86 physically engages a portion of the cam 70. The projecting element 82 extends partly into the opening 68.

The spring 54 is disposed in a spring chamber in its preloaded condition between stops 43 and 56 and urges the sub unit 24 longitudinally of the scale to cause the peripheral edge of cam 70 to engage the element 86 of the screw 84. When the angular disposition of the knob 80 and cam 70 is such that the zero point of the calibrations is aligned with the datum line 81, the high point 74 of the cam is engagement with the element 86 and the sub unit 24 including its mounted shell extension are disposed as far to the right as they can go, so that the lateral edge 30 of the scale or rule is engaged by the juxtaposed lateral edge 14 of the slidable sub unit 24. The zero point 81 shall then be exactly one complete unit, illustratively one inch, from the first calibration 34 on the fixed scale. This assures perfect calibration.

As the knob 80 is turned, and with it the cam 70, relative to the datum line, a certain number of the calibrations on the dial element 78 will pass by the datum line 81, while simultaneously the cam 70 in response to its angular change in position, will therefore move out from under or against the bias of the spring 54. The expansion of the spring 54, however, will continue to maintain cam 70 in contact with the element 86, while forcing the slidable sub unit 24 longitudinally of the scale away from the edge 14.

This moves the zero calibration on the dial 78 away from its starting point. Obviously, it also moves all other calibrations away from their respective starting points. With a full traverse of the cam between the high and low points, one full tenth of an inch will have been traversed by the sliding sub unit 24, and hence of its zero line or calibrations from its starting position. If the graduations on the dial 78 are 100 between the maximum and minimum cam settings representing one-tenth of an inch, then each graduation represents one-thousandth of an inch.

It will be understood that if the decimals of the inches to be measured are less than one-tenth of an inch, this can be determined in thousandths of an inch by subdividing the tenth of an inch into one-hundred equal parts by turning knob 80 from its zero on datum line 81. This will move the zero calibration from its starting position the desired number of thousandths of an inch. If the decimal of the inch beyond the even numbered inches happens to be more than one-tenth of an inch, the first one-tenth thereof is measured by utilizing as a zero the next calibration to the zero calibration, then rotating the knob 80 the desired angular distance to bring the selected calibration opposite the datum line 81 representative of the selected number of thousandths of an inch of measurement change.

The cam element is rotatably mounted on the movable sub unit 24 along with a graduated dial. When the knob 80 is turned by an operator, the cam 70 is also rotated and the dial will be moved from its zero position. As mentioned, the graduations on the dial which are aligned with the zero reference line 81 represent the desired measurement.

When the rule 10 is properly calibrated, the zero position of the dial 80 will be aligned with the zero reference line 81 and the edge 30 will be in physical engagement with the edge 14. At this point, the movable sub unit 24 will be at its most extreme right position, with the element 86 engaging the cam 70 at its highest point.

As the dial 78 and consequently the cam 70 is rotated, the spring 54 forces the movable sub unit 24 away from the main portion 11 of the rule, with the distance moved being precisely measured by the alignment of the graduated dial with respect to the zero reference line 81. As the cam is rotated, the lower portion of the cam engages the element 86 until finally the lowermost point of the cam is reached with the movable element 24 then being at its extreme left position.

It is seen that if the shaft 76, the cam 70, the element 86 or any of their associated parts become worn or loose from excessive use, the dial 80 may not indicate a zero reading when the edge 14 engages the edge 30. For example, if the rule is miscalibrated, a reading, plus or minus, will be indicated on the scale, with the edges 14 and 30 in physical engagement with each other. Unless this condition is corrected, erroneous readings will result from the use of the rule.

The subject invention provides a relatively simple means for periodically calibrating the rule if and when it becomes uncalibrated. The calibration may be done conveniently by an operator with the rule facing him using an Allen wrench 87.

If the zero calibration is off, the operator may insert the wrench 87 into the head of the screw 84 and turn the screw until a true zero calibration is indicated, with the edges 14 and 30 in engagement with each other. This operation may require several manipulations and turnings of the dial before precise calibration is attained.

Effectively, the screw 84 controls the position of the movable sub unit 24. For example, if the screw 84 is moved inwardly with the end element 86 against the cam 70, the movable sub unit will be moved to the right. In similar manner, if the screw 84 is moved outwardly toward the left, the cam 70 will be moved to the left.

A feature of the present invention includes the provision of a rectangular groove 88 in the dial. The purpose of this groove is to receive a tool to hold the dial 78 firmly in place while the knob 80 is manually screwed in place during the final assembly of the rule at the factory. This minimizes the likelihood of the rule becoming miscalibrated by the insertion of the knob causing the dial to move.

Other means means may be employed to assure that the final insertion of the knob 80 will not cause the dial 78 to move and cause miscalibration of the rule. For example, a fixed pin or other means may be included on the bottom portion of the dial 80 and fit into an opening which may be made in the cam 70. This will assure that the relative position of the cam 70 will always be the same with respect to the position of the dial 78.

An element 90 is threadedly mounted to the rule for manual handling by an operator.

While the subject invention has been illustrated as being graduated in inches, other units of measurements may of course be used. The main parts of the rule may be steel, aluminum or any other suitable material.

What is claimed is:

1. A flat rule comprising a main portion, an end portion spaced from said main portion said end portion including a threaded opening extending longitudinally therethrough a movable portion disposed between said main and end portions, said movable portion being dimensioned less than the space between said main and end portions, said movable portion including a graduated dial rotatably mounted with respect to a fixed datum point on said movable portion, the limits of movement of said movable element being defined by said space between said main and end portions, means for continuously biasing said movable portion away from said main portion and towards said end portion to control the position of said movable element, a screw extending through said threaded opening and extending outwardly of said end portion forming an adjustable stop element for limiting the degree of movement of said movable portion towards said end portion, a rotatable cam element fixed to said dial on said movable portion and engaging said stop element, and means for longitudinally varying the position of said screw when said rule is disposed on a flat surface.

2. The invention as set forth in claim 1 wherein said rule includes a knob fixedly attachable to said dial and said dial includes a groove to receive a tool to hold said dial in place when said knob is mechanically attached to said movable portion.

3. The invention as set forth in claim 1 wherein means are provided to maintain said dial and said cam element in fixed relationship with respect to each other.

References Cited
UNITED STATES PATENTS

| | | | |
|---|---|---|---|
| 21,861 | 10/1858 | Yale | 33—112 |
| 2,325,767 | 8/1943 | Glouton | 33—147 |
| 2,554,099 | 5/1951 | Ermold | 33—107 |
| 2,668,362 | 2/1954 | Johnson | 33—148 X |
| 3,149,592 | 9/1964 | Casas-Robert | 74—569 X |
| 3,182,403 | 5/1965 | Zwick | 33—143 |

HARRY N. HAROIAN, *Primary Examiner.*